United States Patent
Xu et al.

(10) Patent No.: US 11,521,340 B2
(45) Date of Patent: Dec. 6, 2022

(54) EMOTICON PACKAGE GENERATION METHOD AND APPARATUS, DEVICE AND MEDIUM

(71) Applicant: BEIJING BAIDU NETCOM SCIENCE AND TECHNOLOGY CO., LTD., Beijing (CN)

(72) Inventors: Xianglong Xu, Beijing (CN); Jianfeng Zhu, Beijing (CN); Jiahua Cui, Beijing (CN); Jing Xiang, Beijing (CN); Hongtao Li, Beijing (CN); Chen Han, Beijing (CN); Shufei Lin, Beijing (CN); Ying Su, Beijing (CN); Shicao Li, Beijing (CN); Huiqin Li, Beijing (CN); Xiaochu Gan, Beijing (CN); Fei Gao, Beijing (CN); Jiale Yang, Beijing (CN); Xueyun Ma, Beijing (CN); Guohong Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 17/280,142

(22) PCT Filed: Jul. 3, 2020

(86) PCT No.: PCT/CN2020/100034
§ 371 (c)(1),
(2) Date: Mar. 25, 2021

(87) PCT Pub. No.: WO2021/169134
PCT Pub. Date: Sep. 2, 2021

(65) Prior Publication Data
US 2022/0114776 A1    Apr. 14, 2022

(30) Foreign Application Priority Data
Feb. 28, 2020   (CN) .......................... 202010128305.6

(51) Int. Cl.
*G06T 11/60* (2006.01)
*G06F 40/279* (2020.01)
(Continued)

(52) U.S. Cl.
CPC ............ *G06T 11/60* (2013.01); *G06F 40/279* (2020.01); *G06F 40/30* (2020.01); *G06V 10/761* (2022.01); *G06V 40/176* (2022.01)

(58) Field of Classification Search
CPC ....... G06T 11/60; G06T 13/80; G06F 40/279; G06F 40/30; G06F 16/5866;
(Continued)

(56) References Cited

U.S. PATENT DOCUMENTS

2015/0036930 A1   2/2015  Dishi et al.
2015/0286371 A1*  10/2015 Degani ................. G06F 40/253
                                                           715/835
(Continued)

FOREIGN PATENT DOCUMENTS

CN    106844659 A    6/2017
CN    107369196 A    11/2017
(Continued)

OTHER PUBLICATIONS

International Search Report issued from the International Search Authority to Application No. PCT/CN2020/100034 dated Nov. 30, 2020, 5 pages.
(Continued)

*Primary Examiner* — Jennifer Mehmood
*Assistant Examiner* — Andrew Shin
(74) *Attorney, Agent, or Firm* — Hunton Andrews Kurth LLP

(57) ABSTRACT

Provided are an emoticon package generation method and apparatus, a device and a medium which relate to the field of graphic processing and in particular to Internet technolo-
(Continued)

gies. The specific implementation solution is: determining at least one of associated text of an emoticon picture or a similar emoticon package of an emoticon picture, where the associated text of the emoticon picture includes at least one of main part information, scenario information, emotion information, action information or connotation information; determining target matching text from the at least one of the associated text of the emoticon picture or associated text of the similar emoticon package; and superimposing the target matching text on the emoticon picture to generate a new emoticon package.

19 Claims, 2 Drawing Sheets

(51) Int. Cl.
  *G06F 40/30* (2020.01)
  *G06V 10/74* (2022.01)
  *G06V 40/16* (2022.01)

(58) Field of Classification Search
  CPC .............. G06F 16/3344; G06F 16/335; G06F 16/7834; G06F 16/786; G06V 10/761; G06V 40/176; G06V 40/20
  See application file for complete search history.

(56) References Cited

U.S. PATENT DOCUMENTS

| | | | |
|---|---|---|---|
| 2017/0154210 A1 | 6/2017 | Li et al. | |
| 2017/0185581 A1* | 6/2017 | Bojja | G06F 16/353 |
| 2019/0130498 A1 | 5/2019 | Constantinides | |
| 2020/0051341 A1 | 2/2020 | Lee et al. | |
| 2021/0192800 A1* | 6/2021 | Dutta | G06T 11/00 |

FOREIGN PATENT DOCUMENTS

| | | |
|---|---|---|
| CN | 109671137 A | 4/2019 |
| CN | 110706312 A | 1/2020 |
| CN | 110719525 A | 1/2020 |
| CN | 111353064 A | 6/2020 |
| JP | 2004023225 A | 1/2004 |
| JP | 2011192008 A | 9/2011 |

OTHER PUBLICATIONS

Extended European Search Report issued from the European Patent Office to EP Application No. 20864289.2 dated Nov. 4, 2021, 9 pages.
Extended European Search Report issued from the European Patent Office to EP Application No. 20864289.2 dated Jul. 25, 2022, 8 pages.
Japanese Office Action, from the Japan Patent Office, issued to JP Application No. 2021-516910, dated May 31, 2022, 12 pages.

* cited by examiner

EMOTICON PACKAGE GENERATION METHOD AND APPARATUS, DEVICE AND MEDIUM

CROSS-REFERENCE TO RELATED APPLICATION

This is a U.S. national stage application, filed under 37 U.S.C. § 371, of International Patent Application No. PCT/CN2020/100034, filed on Jul. 3, 2020, which is based on and claims priority to Chinese Patent Application No. 202010128305.6 filed with the China National Intellectual Property Administration on Feb. 28, 2020, the disclosures of which are incorporated herein by reference in their entirety.

TECHNICAL FIELD

The present disclosure relates to the field of image processing, for example, to Internet technologies. Specifically, an emoticon package generation method and apparatus, a device and a medium are provided in the embodiments of the present disclosure.

BACKGROUND

In recent years, with the popularization of instant messaging socialization, original content of a user on the Internet has been continuously enriched, and the trend of rich media in a text input scenario has become more and more apparent. As a special image language, emoticon packages are widely used in the input scenario.

At present, the product that provides emoticon resources for Internet users is mainly emoticon search, that is, a user can manually input text, and the system can automatically generate a relevant emoticon package that matches the text.

However, the emoticon search, as a content-based product, provides results strongly depending on emoticon package resources which are currently produced manually with a long production period and high cost.

SUMMARY

The present disclosure provides an emoticon package generation method and apparatus, a device and a medium so as to automatically and accurately generate an emoticon package.

An emoticon package generation method is provided in the embodiments of the present disclosure. The method includes steps described below.

At least one of associated text of an emoticon picture or a similar emoticon package of an emoticon picture is determined, where the associated text of the emoticon picture includes at least one of main part information, scenario information, emotion information, action information or connotation information. Target matching text is determined from the at least one of the associated text of the emoticon picture or associated text of the similar emoticon package. The target matching text is superimposed on the emoticon picture to generate a new emoticon package.

According to the embodiments of the present disclosure, at least one of associated text of an emoticon picture or a similar emoticon package of an emoticon picture are determined and at least one of the associated text of the emoticon picture or associated text of the similar emoticon package is used as candidate matching text so that the candidate matching text can be automatically determined.

The target matching text is determined from the candidate matching text. The associated text of the emoticon picture includes at least one of main part information, scenario information, emotion information, action information or connotation information. Moreover, the similar emoticon package and the emoticon picture have similar characteristics. Therefore, the content information of the emoticon picture is described in the determined candidate matching text. Compared with target matching text determined from preset text, the target matching text determined in the embodiments of the present disclosure can more accurately describe the emoticon picture, that is, the accuracy of the target matching text is improved. The accurately determined target matching text is finally superimposed on the emoticon picture, and thus an emoticon package is automatically and accurately generated.

Other aspects can be understood after the drawings and the detailed description are read and understood.

Further, the step of determining the associated text of the emoticon picture includes a step described below.

The associated text of the emoticon picture is determined according to the associated text of the similar emoticon package. A determination dimension of the associated text of the emoticon picture is enriched on the basis of the technical feature that the associated text of the emoticon picture is determined according to the associated text of the similar emoticon package in the embodiments of the present disclosure.

Further, the step of determining the associated text of the emoticon picture according to the associated text of the similar emoticon package includes steps described below.

Target text is determined from the associated text of the similar emoticon package based on a word use frequency. The associated text of the emoticon picture is determined from the target text. The accuracy of the associated text of the emoticon picture is improved on the basis of the technical feature that target text is determined from the associated text of the similar emoticon package based on a word use frequency and the associated text of the emoticon picture is determined from the target text in the embodiments of the present disclosure.

Further, the step of determining the associated text of the emoticon picture from the target text includes steps described below.

A recognition result of the emoticon picture is matched with the target text. Repeated text is determined according to a matching result. The repeated text is filtered out from the recognition result of the emoticon picture and the target text to obtain the associated text of the emoticon picture, where the recognition result of the emoticon picture includes the emotion information and the main part information.

The text content of the associated text is enriched on the basis of the technical feature that the recognition result of the emoticon picture and the target text are fused and the fused text is used as the associated text of the emoticon picture in the embodiments of the present disclosure.

Since the recognition result of the emoticon picture includes emotion information and main part information, the associated text determined based on the recognition result of the emoticon picture includes information of at least two dimensions, that is, the text dimension of the associated text is enriched. Therefore, the determined associated text of the emoticon picture is richer and more diverse based on the determination manner in the embodiments of the present disclosure.

Further, the step of determining the similar emoticon package of the emoticon picture includes steps described below.

Image information of the emoticon picture is matched with image information of an existing emoticon package, and information about the associated text of the emoticon picture is matched with information about associated text of the existing emoticon package. In response to an image matching degree or a text matching degree satisfying a set condition, the existing emoticon package is used as the similar emoticon package.

On the basis of the technical feature that the similar emoticon package is determined from two information dimensions of image information and associated text information in the embodiments of the present disclosure, the recall rate of the similar emoticon package is improved, and the recall rate of the candidate matching text of the emoticon picture is further improved based on the associated text of the similar emoticon package.

Further, the image information includes emoticon package category information and object category information.

The accuracy of the similar emoticon package is improved on the basis of the technical feature that the similar emoticon package is determined from the existing emoticon package based on emoticon package category information and object category information in the embodiments of the present disclosure.

Further, the step of determining the target matching text from the at least one of the associated text of the emoticon picture or the associated text of the similar emoticon package includes a step described below.

The target matching text is determined from candidate matching text based on at least one of a word use frequency, a word length or word semantics, where the candidate matching text includes the at least one of the associated text of the emoticon picture or the associated text of the similar emoticon package.

The accuracy of determining the target matching text is further improved on the basis of the technical feature that the target matching text is determined from candidate matching text based on at least one of a word use frequency, a word length or word semantics in the embodiments of the present disclosure.

Further, the step of determining the target matching text from the candidate matching text based on the word length includes a step described below.

In response to a word length of the candidate matching text being within a set length range, the candidate matching text is determined as the target matching text.

The target matching text is accurately determined on the basis of the technical feature that whether a word length of the candidate matching text is within a set length range is determined so that the target matching text is determined from the candidate matching text in the embodiments of the present disclosure.

Further, the step of determining the target matching text from the candidate matching text based on the word semantics includes steps described below.

It is determined that word semantics of the candidate matching text includes word information about at least one of an emotion word, a popular word or an entity word. The target matching text is determined from the candidate matching text according to the word information.

The target matching text is accurately determined on the basis of the technical feature that the target matching text is determined from the candidate matching text according to the fact that word semantics of the candidate matching text includes the semantics information about at least one of an emotion word, a popular word or an entity word in the embodiments of the present disclosure.

Further, before determining the at least one of the associated text of the emoticon picture or the similar emoticon package of the emoticon picture, the method further includes steps described below.

A video image including a target part of a target object is extracted from a video. Recognition of at least one of a speaking or an action execution amplitude is performed on the extracted video image. The emoticon picture is determined from the video image according to a recognition result.

The emoticon picture is accurately determined on the basis of the technical feature that recognition of the at least one of the speaking or the action execution amplitude is performed on the extracted video image and the emoticon picture is determined from the video image according to a recognition result in the embodiments of the present disclosure.

Further, the step of determining a position at which the target matching text is superimposed includes steps described below.

A background area in the emoticon picture is detected. A largest inscribed graphic region in the background area is determined. The largest inscribed graphic region is used as the position at which the target matching text is superimposed.

The position at which the target matching text is superimposed is determined on the basis of the technical feature that a background area in the emoticon picture is detected and the largest inscribed graphic region in the background area is used as the position at which the target matching text is superimposed in the embodiments of the present disclosure.

An emoticon package generation apparatus is further provided in the embodiments of the present disclosure. The apparatus includes an associated text determination module, a matching text determination module and an emoticon package generation module.

The associated text determination module is configured to determine at least one of associated text of an emoticon picture or a similar emoticon package of an emoticon picture, where the associated text of the emoticon picture includes at least one of main part information, scenario information, emotion information, action information or connotation information.

The matching text determination module is configured to determine target matching text from at least one of the associated text of the emoticon picture or associated text of the similar emoticon package.

The emoticon package generation module is configured to superimpose the target matching text on the emoticon picture to generate a new emoticon package.

Further, the associated text determination module includes an associated text determination unit.

The associated text determination unit is configured to determine the associated text of the emoticon picture according to the associated text of the similar emoticon package.

Further, the associated text determination unit is configured to determine target text from the associated text of the similar emoticon package based on a word use frequency and determine the associated text of the emoticon picture from the target text.

Further, the operation of determining the associated text of the emoticon picture from the target text includes steps described below.

A recognition result of the emoticon picture is matched with the target text. Repeated text is determined according to a matching result. The repeated text is filtered out from the recognition result of the emoticon picture and the target text to obtain the associated text of the emoticon picture, where the recognition result of the emoticon picture includes emotion information and main part information.

Further, the associated text determination module includes an emoticon picture matching unit and an emoticon package selection unit.

The emoticon picture matching unit is configured to match image information of the emoticon picture with image information of an existing emoticon package and match information about the associated text of the emoticon picture with information about associated text of the existing emoticon package.

The emoticon package selection unit is configured to: in response to an image matching degree or a text matching degree satisfying a set condition, use the existing emoticon package as the similar emoticon package.

Further, the image information includes emoticon package category information and object category information.

Further, the matching text determination module includes a matching text determination unit.

The matching text determination unit is configured to determine the target matching text from candidate matching text based on at least one of a word use frequency, a word length or word semantics, where the candidate matching text includes the at least one of the associated text of the emoticon picture or the associated text of the similar emoticon package.

Further, the matching text determination unit is specifically configured to perform an operation described below.

In response to a word length of the candidate matching text being within a set length range, the candidate matching text is determined as the target matching text.

Further, the matching text determination unit is specifically configured to perform operations described below.

It is determined that word semantics of the candidate matching text includes word information about at least one of an emotion word, a popular word or an entity word. The target matching text is determined from the candidate matching text according to the word information.

Further, the apparatus further includes a video image extraction module, an image recognition module and an emoticon picture determination module.

The video image extraction module is configured to extract a video image including a target part of a target object from a video before the at least one of the associated text of the emoticon picture or the similar emoticon package of the emoticon picture is determined.

The image recognition module is configured to perform recognition of at least one of a speaking or an action execution amplitude on the extracted video image.

The emoticon picture determination module is configured to determine the emoticon picture from the video image according to a recognition result.

Further, the apparatus further includes a background detection module, a region determination module and a position determination module.

The background detection module is configured to detect a background area in the emoticon picture.

The region determination module is configured to determine a largest inscribed graphic region in the background area.

The position determination module is configured to use the largest inscribed graphic region as the position at which the target matching text is superimposed.

An electronic device is further provided in the embodiments of the present disclosure.

The device includes at least one processor and a memory.

The memory is communicatively connected to the at least one processor.

The memory stores instructions executable by the at least one processor to cause the at least one processor to perform the method of any one of embodiments of the present disclosure.

The present disclosure provides a non-transitory computer-readable storage medium storing computer instructions for causing a computer to perform the method of any one of embodiments of the present disclosure.

BRIEF DESCRIPTION OF DRAWINGS

The drawings are intended to provide a better understanding of the present solutions and not to limit the present disclosure.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it will be appreciated by those having ordinary skill in the art that various changes and modifications may be made to the embodiments described herein without departing from the scope and spirit of the present disclosure. Similarly, the description of well-known functions and constructions is omitted hereinafter for clarity and conciseness.

First Embodiment

Figure 1:
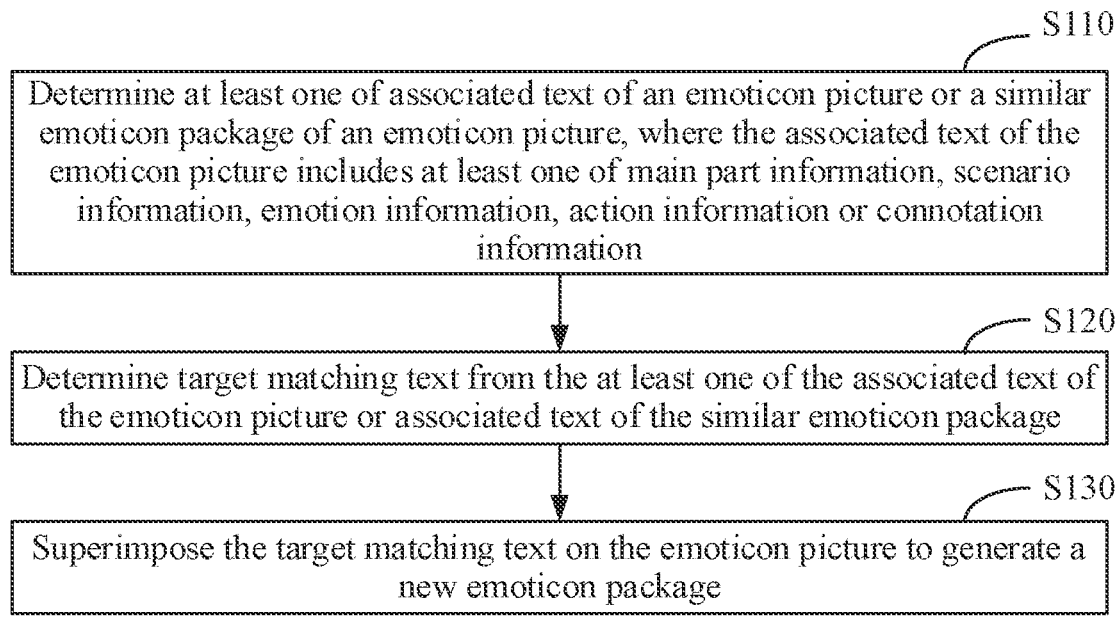
FIG. 1 is a flowchart of an emoticon package generation method according to a first embodiment of the present disclosure.

FIG. 1 is a flowchart of an emoticon package generation method according to a first embodiment of the present disclosure. The embodiment may be applied to the case of automatically generating an emoticon package. The method may be performed by an emoticon package generation apparatus. The apparatus may be implemented by software, hardware or a combination thereof. Referring to FIG. 1, the emoticon package generation method provided in the embodiment of the present disclosure includes steps described below.

In S110, at least one of associated text of an emoticon picture or a similar emoticon package of an emoticon picture are determined.

The emoticon picture is an expression image in an emoticon package, and the expression image may be a static image or a dynamic image.

Specifically, the associated text of the emoticon picture may be a tag of the emoticon picture. Specifically, the associated text of the emoticon picture includes at least one of main part information, scenario information, emotion information, action information or connotation information of the emoticon picture.

The main part information includes at least one of information about rage comics, information about an adorable pet, information about an adorable baby, information about a film and television variety show, information about a star and online celebrity, information about an original design or information about a game.

The scenario information includes at least one of comment information, office information, a festival event, chat information, fight image information, love information or education information.

The emotion information includes at least one of information about a positive emotion, information about a neutral emotion or information about a negative emotion.

The action information includes at least one of entertainment information, daily behavior information or expression information.

The connotation information includes information about various jokes.

The similar emoticon package of the emoticon picture refers to an existing emoticon package similar to the emoticon picture.

Specifically, the step of determining the associated text of the emoticon picture includes a step described below.

A recognition result of the emoticon picture is used as the associated text of the emoticon picture.

The recognition result of the emoticon picture may include an emotion recognition result, a main part recognition result, a scenario recognition result and the like.

Exemplarily, the associated text of the emoticon picture has at least two dimensions.

In an embodiment, the step of determining the similar emoticon package of the emoticon picture includes steps described below.

The associated text of the emoticon picture is matched with associated text of existing emoticon packages separately.

The similar emoticon package is determined from the existing emoticon packages according to matching results.

The step of determining the similar emoticon package of the emoticon picture may include steps described below.

Image information of the emoticon picture is matched with image information of existing emoticon packages separately.

The similar emoticon package is determined from the existing emoticon packages according to matching results.

The image information refers to information recognized from an image.

To improve the recall rate of the similar emoticon package, the step of determining the similar emoticon package of the emoticon picture includes steps described below.

Image information of the emoticon picture is matched with image information of an existing emoticon package, and information about the associated text of the emoticon picture is matched with information about associated text of the existing emoticon package.

In response to an image matching degree or a text matching degree satisfying a set condition, the existing emoticon package is used as the similar emoticon package.

On the basis of the technical feature that the similar emoticon package is determined from two information dimensions of image information and associated text information in the embodiments of the present disclosure, the recall rate of the similar emoticon package is improved, and the recall rate of the candidate matching text of the emoticon picture is further improved based on the associated text of the similar emoticon package.

To improve the accuracy of the similar emoticon package, the image information includes emoticon package category information and object category information.

The emoticon package category information refers to information identifying category characteristics of an emoticon package and may specifically be information in a tag system of the emoticon package.

The object category information refers to information identifying category characteristics of an object and may specifically be information in a tag system of ImageNet.

In S120, target matching text is determined from at least one of the associated text of the emoticon picture or associated text of the similar emoticon package.

The target matching text is a text to be superimposed on the emoticon picture to generate an emoticon package.

In an embodiment, the step of determining the target matching text from the at least one of the associated text of the emoticon picture or the associated text of the similar emoticon package includes a step described below.

The target matching text is determined from candidate matching text based on at least one of a word use frequency, a word length or word semantics, where the candidate matching text includes the at least one of the associated text of the emoticon picture or the associated text of the similar emoticon package.

The word use frequency refers to an occurrence frequency of a word in the at least one of the associated text of the emoticon picture or the associated text of the similar emoticon package.

In an embodiment, the step of determining the target matching text from the candidate matching text based on the word semantics includes steps described below.

It is determined that word semantics of the candidate matching text includes word information about at least one of an emotion word, a popular word or an entity word.

The target matching text is determined from the candidate matching text according to the word information.

In an embodiment, the step of determining the target matching text from the candidate matching text based on the word length includes a step described below.

In response to a word length of the candidate matching text being within a set length range, the candidate matching text is determined as the target matching text.

In an embodiment, a step of determining the target matching text from candidate matching text based on a word use frequency, a word length and word semantics includes steps described below.

The candidate matching text is scored separately based on the word use frequency, the word length and the word semantics.

Weighted summation is performed on the scoring results, and the target matching text is determined from the candidate matching text according to the summation result.

In S130, the target matching text is superimposed on the emoticon picture to generate a new emoticon package.

In an embodiment, the step of determining a position at which the target matching text is superimposed includes steps described below.

A background area in the emoticon picture is detected.

A largest inscribed graphic region in the background area is determined.

The largest inscribed graphic region is used as the position at which the target matching text is superimposed.

According to the technical solution of the embodiment of the present disclosure, the at least one of associated text of the emoticon picture or the similar emoticon package of the emoticon picture is determined and the at least one of the associated text of the emoticon picture or the associated text of the similar emoticon package is used as the candidate matching text so that the candidate matching text can be automatically determined.

The target matching text is determined from the candidate matching text. The associated text of the emoticon picture includes at least one of main part information, scenario information, emotion information, action information or connotation information. Moreover, the similar emoticon package and the emoticon picture have similar characteristics. Therefore, the content information of the emoticon picture is described in the determined candidate matching text. Compared with target matching text determined from preset text, the target matching text determined in the embodiment of the present disclosure can more accurately describe the emoticon picture, that is, the accuracy of the target matching text is improved. The accurately determined target matching text is finally superimposed on the emoticon picture, and thus an emoticon package is automatically and accurately generated.

Further, before determining the at least one of the associated text of the emoticon picture or the similar emoticon package of the emoticon picture, the method further includes steps described below.

A video image including a target part of a target object is extracted from a video.

Recognition of at least one of a speaking or an action execution amplitude is performed on the extracted video image.

The emoticon picture is determined from the video image according to a recognition result.

The emoticon picture is accurately determined on the basis of the technical feature that recognition of the at least one of the speaking or the action execution amplitude is performed on the extracted video image and the emoticon picture is determined from the video image according to the recognition result in the embodiments of the present disclosure.

The emoticon picture may also be determined from the video image according to the recognition results of other dimensions of the video image or according to the preceding recognition result and the recognition results of other dimensions, so that the accuracy of determining the emoticon picture is improved.

Second Embodiment

Figure 2:
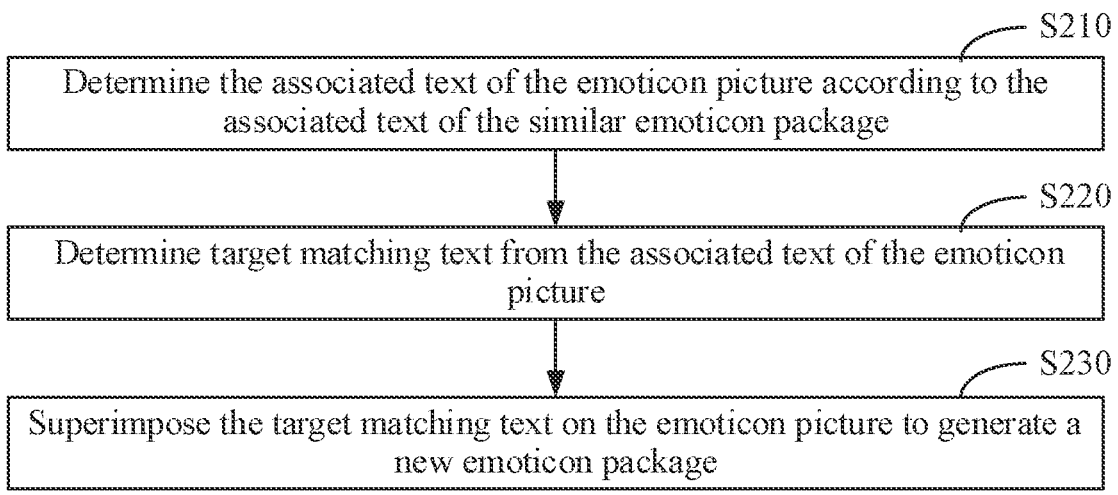
FIG. 2 is a flowchart of an emoticon package generation method according to a second embodiment of the present disclosure.

FIG. 2 is a flowchart of an emoticon package generation method according to a second embodiment of the present disclosure. The embodiment is an optional solution provided on the basis of the preceding embodiment. Referring to FIG. 2, the emoticon package generation method provided in the embodiment of the present disclosure includes steps described below.

In S210, the associated text of the emoticon picture is determined according to the associated text of the similar emoticon package.

In an embodiment, the step of determining the associated text of the emoticon picture according to the associated text of the similar emoticon package includes a step described below.

The associated text of the similar emoticon package is used as the associated text of the emoticon picture.

To further improve the accuracy of the associated text of the emoticon picture, the step of determining the associated text of the emoticon picture according to the associated text of the similar emoticon package includes steps described below.

Target text is determined from the associated text of the similar emoticon package based on a word use frequency.

The associated text of the emoticon picture is determined from the target text.

The word use frequency refers to an occurrence frequency of a word in the associated text of the similar emoticon package.

To further enrich the text content of the associated text of the emoticon picture, the step of determining the associated text of the emoticon picture according to the associated text of the similar emoticon package includes steps described below.

A recognition result of the emoticon picture is matched with the target text.

Repeated text is determined according to a matching result.

The repeated text is filtered out from the recognition result of the emoticon picture and the target text to obtain the associated text of the emoticon picture.

To further enrich the text dimension of the associated text of the emoticon picture, the step of determining the associated text of the emoticon picture according to the associated text of the similar emoticon package includes a feature described below.

The recognition result of the emoticon picture includes emotion information and main part information.

The text content of the associated text is enriched on the basis of the technical feature that the recognition result of the emoticon picture and the target text are fused and the fused text is used as the associated text of the emoticon picture in the embodiment of the present disclosure.

Since the recognition result of the emoticon picture includes emotion information and main part information, the associated text determined based on the recognition result of the emoticon picture includes information of at least two dimensions, that is, the text dimension of the associated text is enriched. Therefore, the determined associated text of the emoticon picture is richer and more diverse based on the determination manner in the embodiment of the present disclosure.

In S220, target matching text is determined from the associated text of the emoticon picture.

In S230, the target matching text is superimposed on the emoticon picture to generate a new emoticon package.

According to the technical solution provided in the embodiment of the present disclosure, the associated text of the emoticon picture is determined according to the associated text of the similar emoticon package, so that a determination dimension of the associated text of the emoticon picture is enriched.

Third Embodiment

The embodiment is an optional solution provided on the basis of the preceding embodiment by using an example in which the associated text is a tag. An emoticon package generation method provided in the embodiment of the present disclosure includes steps described below.

Video images are extracted from a video resource.

Face detection is performed on the video images, and a video image including faces is selected from the video images according to a detection result.

Face images are extracted from the video image including the faces.

Emotion recognition, speaking recognition and exaggerated action recognition are performed on the face images.

A face image meeting requirements is selected from the face images according to recognition results.

Video tracking is performed on the face image meeting the requirements to determine a face image sequence of the same person.

A static or dynamic emoticon picture is determined according to the determined face image sequence.

A first similar emoticon package is determined from existing emoticon packages according to expression information and object information of the emoticon picture.

A tag for at least one dimension of the emoticon picture is determined according to associated text of the first similar emoticon package and star information, emotion information and information about an adorable pet which are included in the emoticon picture.

A second similar emoticon package is determined from the existing emoticon packages based on the tag of the emoticon picture.

Target matching text of the emoticon picture is determined from the tag of the emoticon picture, the associated text of the first similar emoticon package and associated text of the second similar emoticon package based on a word occurrence frequency, a word length and word semantics.

A font size, font color, font style, font motion and superposition position of the target matching text are determined.

The target matching text is superimposed at the superposition position in the target emoticon picture according to the determined font size, font color, font style and font motion of the target matching text. Thus, a new emoticon package is generated.

In an embodiment, the step of determining the superposition position includes steps described below.

A background area in the emoticon picture is detected.

A largest inscribed graphic region in the background area is determined.

If the determined largest inscribed graphic region satisfies a set requirement, the region is used as the superposition position.

If the determined largest inscribed graphic region does not satisfy the requirement, the lowermost region in the emoticon picture is used as the superposition position.

In an embodiment, the step of determining the font size of the target matching text includes steps described below.

The target matching text is segmented at the granularity of characters to obtain the number of characters.

The font size of the text is determined according to the number of characters, the size of the picture and the superposition position of the text.

In an embodiment, the step of determining the superposition position of the target matching text includes a step described below.

The superposition position is determined according to content information of the emoticon picture. The superposition position of the text changes according to actual situations of the picture.

The superposition principle is as follows: the superimposed text should not block the main part, should be centered and have a gap from a picture border; and the text can be moved to the left or right appropriately according to the principle of not blocking the important main part.

Exemplarily, for a static image, a clustering algorithm is used to detect foreground and background, and morphological image processing methods such as corrosion and expansion are used to eliminate abnormal points. In the background area, the largest inscribed rectangle is selected as the superposition position; if the selected position region is too small or a position region does not exist, the lowermost region of the picture is used as the superposition position.

The detection of foreground and background and processing of abnormal points for a dynamic image are consistent with those for the static image. On such basis, a multi-frame foreground fusion strategy is added for the dynamic image, that is, the intersection of the fitting regions selected for the multi-frame pictures of the dynamic image is used as the final fitting region of the dynamic image, thus improving the selection reliability of the fitting region.

In an embodiment, the step of determining the font color and a font type includes a step described below.

The font color and the font type are determined based on at least one of edge information, color information or angle information in the emoticon picture.

In an embodiment, the step of determining the font color and the font type based on at least one of edge information, color information or angle information in the emoticon picture includes steps described below.

If the emoticon picture is black and white, the font type is randomly determined from FZLanTingHeiS-R-GB and FZDaHei-B02S, and the font color is determined as black or white (black for light background or white for dark background in the picture).

If the emoticon picture is a static color picture, the font type is randomly selected from FZMingShiTiS, FZBiaoZhiS-R-GB, FZDuHeiS, FZPangWa-M18S, FZHuPo-M04S, FZDaHei-B02S and FZCuYuan-M03S; and the font color is randomly selected as follows: black characters with white edges or white characters with black edges.

If the emoticon picture is a dynamic color picture, the font type is randomly selected from FZMingShiTiS, FZBiaoZhiS-R-GB, FZDuHeiS, FZPangWa-M18S, FZHuPo-M04S, FZDaHei-B02S and FZCuYuan-M03S. If the emoticon picture is the dynamic color picture, the font color is as follows: if the picture background is a light background, a character has color black edges, the font color is color (black, white, yellow, pink, blue, orange, cyan or green), and the selected color is high in contrast with the main color of the picture so that the font can be conveniently highlighted; if the picture background is a dark background, a character has color white edges, the font color is color (black, white, yellow, pink, blue, orange, cyan or green), and the selected color is high in contrast with the main color of the picture so that the font can be conveniently highlighted.

After the font style is determined, motion may also be randomly matched and displayed, including font static fitting, font rolling carousel, font sequential display and the like.

The embodiment has the following technical effects: manpower input reduction, high production efficiency, high production timeliness and high-quality effect.

Manpower input reduction: Fully automated emoticon resource production can release production manpower and control production cost.

High production efficiency: A machine can produce large-scale emoticon picture resources instantly when the video source content is provided, greatly improving the emoticon production efficiency and effectiveness.

High production timeliness: The machine can wake up and produce resources at any time, and the processing of sudden content is faster; the high production timeliness is combined with the ability of high production efficiency so that popular content can be quickly processed to generate corresponding emoticon resources for users to use.

High-quality effect: Through accurate extraction of an emoticon picture and accurate determination of target matching text, the finally displayed emoticon package presents an effect that makes it difficult to distinguish the difference between human production and machine production.

Fourth Embodiment

Figure 3:
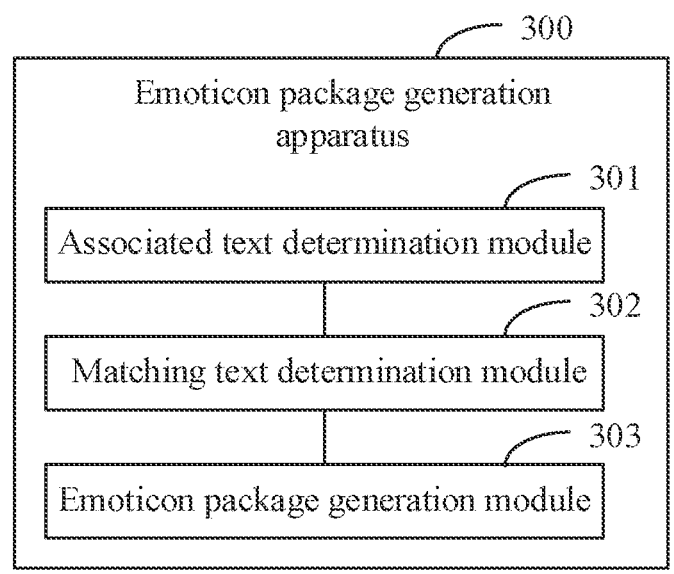
FIG. 3 is a structure diagram of an emoticon package generation apparatus according to a fourth embodiment of the present disclosure.

FIG. 3 is a structure diagram of an emoticon package generation apparatus according to a fourth embodiment of the present disclosure. Referring to FIG. 3, an emoticon package generation apparatus 300 provided in the embodiment of the present disclosure includes: an associated text determination module 301, a matching text determination module 302 and an emoticon package generation module 303.

The associated text determination module 301 is configured to determine at least one of associated text of an emoticon picture or a similar emoticon package of an emoticon picture, where the associated text of the emoticon picture includes at least one of main part information, scenario information, emotion information, action information or connotation information.

The matching text determination module 302 is configured to determine target matching text from at least one of the associated text of the emoticon picture or associated text of the similar emoticon package.

The emoticon package generation module 303 is configured to superimpose the target matching text on the emoticon picture to generate a new emoticon package.

According to the embodiment of the present disclosure, the at least one of the associated text of the emoticon picture or the similar emoticon package of the emoticon picture is determined and the at least one of the associated text of the emoticon picture or the associated text of the similar emoticon package is used as the candidate matching text so that the candidate matching text can be automatically determined.

The target matching text is determined from the candidate matching text. The associated text of the emoticon picture includes at least one of main part information, scenario information, emotion information, action information or connotation information. Moreover, the similar emoticon package and the emoticon picture have similar characteristics. Therefore, the content information of the emoticon picture is described in the determined candidate matching text. Compared with target matching text determined from preset text, the target matching text determined in the embodiment of the present disclosure can more accurately describe the emoticon picture, that is, the accuracy of the target matching text is improved. The accurately determined target matching text is finally superimposed on the emoticon picture, and thus an emoticon package is automatically and accurately generated.

In an embodiment, the associated text determination module includes an associated text determination unit.

The associated text determination unit is configured to determine the associated text of the emoticon picture according to the associated text of the similar emoticon package.

In an embodiment, the associated text determination unit is specifically configured to perform operations described below.

Target text is determined from the associated text of the similar emoticon package based on a word use frequency.

The associated text of the emoticon picture is determined from the target text.

In an embodiment, the operation of determining the associated text of the emoticon picture from the target text includes steps described below.

A recognition result of the emoticon picture is matched with the target text.

Repeated text is determined according to a matching result.

The repeated text is filtered out from the recognition result of the emoticon picture and the target text to obtain the associated text of the emoticon picture, where the recognition result of the emoticon picture includes emotion information and main part information.

In an embodiment, the associated text determination module includes an emoticon picture matching unit and an emoticon package selection unit.

The emoticon picture matching unit is configured to match image information of the emoticon picture with image information of an existing emoticon package and match information about the associated text of the emoticon picture with information about associated text of the existing emoticon package.

The emoticon package selection unit is configured to: in response to an image matching degree or a text matching degree satisfying a set condition, use the existing emoticon package as the similar emoticon package.

In an embodiment, the image information includes emoticon package category information and object category information.

In an embodiment, the matching text determination module includes a matching text determination unit.

The matching text determination unit is configured to determine the target matching text from candidate matching text based on at least one of a word use frequency, a word length or word semantics, where the candidate matching text includes the at least one of the associated text of the emoticon picture or the associated text of the similar emoticon package.

In an embodiment, the matching text determination unit is specifically configured to perform an operation described below.

In response to a word length of the candidate matching text being within a set length range, the candidate matching text is determined as the target matching text.

In an embodiment, the matching text determination unit is specifically configured to perform operations described below.

It is determined that word semantics of the candidate matching text includes word information about at least one of an emotion word, a popular word or an entity word.

The target matching text is determined from the candidate matching text according to the word information.

In an embodiment, the apparatus further includes a video image extraction module, an image recognition module and an emoticon picture determination module.

The video image extraction module is configured to extract a video image including a target part of a target object from a video before the at least one of the associated text of the emoticon picture or the similar emoticon package of the emoticon picture is determined.

The image recognition module is configured to perform recognition of at least one of a speaking or an action execution amplitude on the extracted video image.

The emoticon picture determination module is configured to determine the emoticon picture from the video image according to a recognition result.

In an embodiment, the apparatus further includes a background detection module, a region determination module and a position determination module.

The background detection module is configured to detect a background area in the emoticon picture.

The region determination module is configured to determine a largest inscribed graphic region in the background area.

The position determination module is configured to use the largest inscribed graphic region as the position at which the target matching text is superimposed.

Fifth Embodiment

According to an embodiment of the present disclosure, the present disclosure further provides an electronic device and a readable storage medium.

Figure 4:
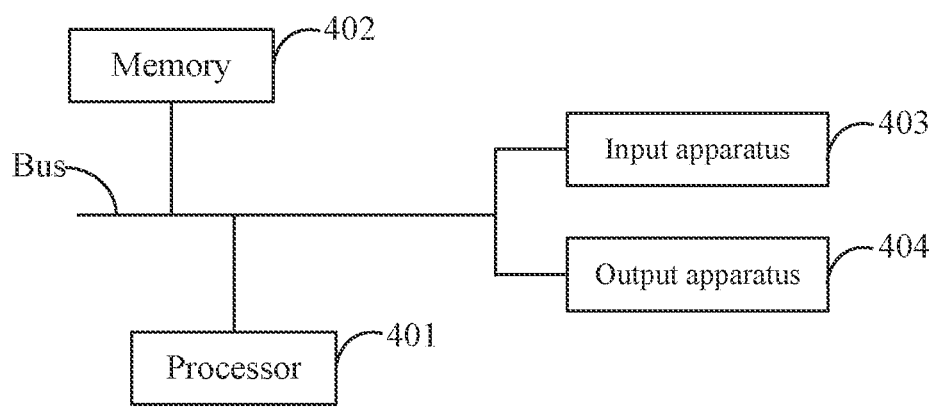
FIG. 4 is a block diagram of an electronic device for implementing an emoticon package generation method according to an embodiment of the present disclosure.

FIG. 4 is a block diagram of an electronic device for implementing an emoticon package generation method according to an embodiment of the present disclosure. Electronic devices are intended to represent various forms of digital computers, for example, laptop computers, desktop computers, worktables, personal digital assistants, servers, blade servers, mainframe computers and other applicable computers. Electronic devices may also represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 4, the electronic device includes one or more processors 401, a memory 402 and interfaces for connecting components, including a high-speed interface and a low-speed interface. The components are interconnected to each other by different buses and may be mounted on a common mainboard or in other manners as desired. The processor may process instructions executed in the electronic device, including instructions stored in or on the memory to make graphic information of a GUI displayed on an external input/output apparatus (for example, a display device coupled to an interface). In other embodiments, if required, multiple processors and/or multiple buses may be used with multiple memories. Similarly, multiple electronic devices may be connected, each providing some necessary operations (for example, a server array, a set of blade servers or a multi-processor system). FIG. 4 shows one processor 401 as an example.

The memory 402 is a non-transitory computer-readable storage medium provided in the present disclosure. The memory stores instructions executable by at least one processor to cause the at least one processor to perform the emoticon package generation method provided in the present disclosure. The non-transitory computer-readable storage medium of the present disclosure stores computer instructions for causing a computer to perform the emoticon package generation method provided in the present disclosure.

The memory 402 as a non-transitory computer-readable storage medium is configured to store a non-transitory software program, a non-transitory computer-executable program and modules, for example, program instructions/modules corresponding to the emoticon package generation method provided in the embodiments of the present disclosure (for example, the associated text determination module 301, the matching text determination module 302 and the emoticon package generation module 303 shown in FIG. 3). The processor 401 executes non-transitory software programs, instructions and modules stored in the memory 402 to execute the various function applications and data processing of a server, that is, implement the emoticon package generation method provided in the preceding method embodiments.

The memory 402 may include a program storage region and a data storage region. The program storage region may store an operating system and an application program required by at least one function. The data storage region may store data created based on the use of the electronic device for generation of an emoticon package. In addition, the memory 402 may include a high-speed random-access memory and a non-transitory memory, for example, at least one disk memory, a flash memory or another non-transitory solid-state memory. In some embodiments, the memory 402 may include memories disposed remote from the processor 401, and these remote memories may be connected, through a network, to the electronic device for generation of an emoticon package. Examples of the preceding network include, but are not limited to, the Internet, an intranet, a blockchain network, a local area network, a mobile communication network and a combination thereof.

The electronic device for the emoticon package generation method may further include an input apparatus 403 and an output apparatus 404. The processor 401, the memory 402, the input apparatus 403, and the output apparatus 404 may be connected via a bus or in other manners. FIG. 4 uses connection via a bus as an example.

The input apparatus 403 may receive input number or character information and generate key signal input related to user settings and function control of the electronic device for generation of an emoticon package. The input apparatus 403 may be, for example, a touchscreen, a keypad, a mouse, a trackpad, a touchpad, a pointing stick, one or more mouse buttons, a trackball or a joystick. The output apparatus 404 may include, for example, a display device, an auxiliary lighting apparatus (for example, an LED), a haptic feedback apparatus (for example, a vibration motor) or the like. The display device may include, but is not limited to, a liquid-crystal display (LCD), a light-emitting diode (LED) display or a plasma display. In some embodiments, the display device may be the touchscreen.

The various embodiments of the systems and techniques described herein may be implemented in digital electronic circuitry, integrated circuitry, an application-specific integrated circuit (ASIC), computer hardware, firmware, software and/or a combination thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input apparatus and at least one output apparatus and transmitting the data and instructions to the memory system, the at least one input apparatus and the at least one output apparatus.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display apparatus (for example, a cathode-ray tube (CRT) or liquid-crystal display (LCD) monitor) for displaying information to the user; and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), the Internet and a blockchain network.

The computing system may include a client and a server. The client and the server are generally remote from each other and typically interact through a communication network. The relationship between the client and the server arises by virtue of computer programs running on the respective computers and having a client-server relationship to each other.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. A method for generating an emoticon package, comprising:

determining at least one of associated text of an emoticon picture or a similar emoticon package of an emoticon picture, wherein the associated text of the emoticon picture comprises at least one of main part information, scenario information, emotion information, action information or connotation information;

determining target matching text from at least one of the associated text of the emoticon picture or associated text of the similar emoticon package;

superimposing the target matching text on the emoticon picture to generate a new emoticon package; and determining a position at which the target matching text is superimposed, which comprises:

detecting a background area in the emoticon picture;

determining a largest inscribed graphic region in the background area; and using the largest inscribed graphic region as the position at which the target matching text is superimposed.

2. The method of claim 1, wherein determining the associated text of the emoticon picture comprises:

determining the associated text of the emoticon picture according to the associated text of the similar emoticon package.

3. The method of claim 2, wherein determining the associated text of the emoticon picture according to the associated text of the similar emoticon package comprises:

determining target text from the associated text of the similar emoticon package based on a word use frequency; and determining the associated text of the emoticon picture from the target text.

4. An electronic device, comprising:

at least one processor; and a memory communicatively connected to the at least one processor;

wherein the memory stores instructions executable by the at least one processor to cause the at least one processor to perform the method of claim 2.

5. The method of claim 3, wherein determining the associated text of the emoticon picture from the target text comprises:

matching a recognition result of the emoticon picture with the target text;

determining repeated text according to a matching result; and filtering out the repeated text from the recognition result of the emoticon picture and the target text to obtain the associated text of the emoticon picture, wherein the recognition result of the emoticon picture comprises the emotion information and the main part information.

6. An electronic device, comprising:

at least one processor; and a memory communicatively connected to the at least one processor;

wherein the memory stores instructions executable by the at least one processor to cause the at least one processor to perform the method of claim 3.

7. An electronic device, comprising:

at least one processor; and a memory communicatively connected to the at least one processor;

wherein the memory stores instructions executable by the at least one processor to cause the at least one processor to perform the method of claim 5.

8. The method of claim 1, wherein determining the similar emoticon package of the emoticon picture comprises:

matching image information of the emoticon picture with image information of an existing emoticon package, and matching information about the associated text of the emoticon picture with information about associated text of the existing emoticon package; and in response to an image matching degree or a text matching degree satisfying a set condition, using the existing emoticon package as the similar emoticon package.

9. The method of claim 8, wherein the image information comprises emoticon package category information and object category information.

10. The method of claim 1, wherein determining the target matching text from the at least one of the associated text of the emoticon picture or the associated text of the similar emoticon package comprises:

determining the target matching text from candidate matching text based on at least one of a word use frequency, a word length or word semantics, wherein the candidate matching text comprises the at least one of the associated text of the emoticon picture or the associated text of the similar emoticon package.

11. The method of claim 10, wherein determining the target matching text from the candidate matching text based on the word length comprises:

in response to a word length of the candidate matching text being within a set length range, determining the candidate matching text as the target matching text.

12. The method of claim 10, wherein determining the target matching text from the candidate matching text based on the word semantics comprises:

determining that word semantics of the candidate matching text comprises word information about at least one of an emotion word, a popular word or an entity word; and determining the target matching text from the candidate matching text according to the word information.

13. The method of claim 1, before determining the at least one of the associated text of the emoticon picture or the similar emoticon package of the emoticon picture, further comprising:

extracting a video image comprising a target part of a target object from a video;

performing recognition of at least one of a speaking or an action execution amplitude on the extracted video image; and determining the emoticon picture from the video image according to a recognition result.

14. An electronic device, comprising:
at least one processor; and
a memory communicatively connected to the at least one processor;
wherein the memory stores instructions executable by the at least one processor to cause the at least one processor to perform the method of claim 1.

15. A non-transitory computer-readable storage medium storing computer instructions for causing a computer to perform the method of claim 1.

16. An apparatus for generating an emoticon package, comprising:

an associated text determination module, which is configured to determine at least one of associated text of an emoticon picture or a similar emoticon package of an emoticon picture, wherein the associated text of the emoticon picture comprises at least one of main part information, scenario information, emotion information, action information or connotation information;

a matching text determination module, which is configured to determine target matching text from the at least one of the associated text of the emoticon picture or associated text of the similar emoticon package; and an emoticon package generation module, which is configured to superimpose the target matching text on the emoticon picture to generate a new emoticon package;

a background detection module, which is configured to detect a background area in the emoticon picture;

a region determination module, which is configured to determine a largest inscribed graphic region in the background area; and a position determination module, which is configured to use the largest inscribed graphic region as the position at which the target matching text is superimposed.

17. The apparatus of claim 16, wherein the associated text determination module comprises:

an associated text determination unit, which is configured to determine the associated text of the emoticon picture according to the associated text of the similar emoticon package.

18. The apparatus of claim 16, wherein the associated text determination module comprises:

an emoticon picture matching unit, which is configured to perform at least one of matching image information of the emoticon picture with image information of an existing emoticon package or matching associated text information of the emoticon picture with associated text information of an existing emoticon package; and an emoticon package selection unit, which is configured to: in response to an image matching degree or a text matching degree satisfying a set condition, use the existing emoticon package as the similar emoticon package.

19. The apparatus of claim 16, wherein the matching text determination module comprises:

a matching text determination unit, which is configured to determine the target matching text from candidate matching text based on at least one of a word use frequency, a word length or word semantics, wherein the candidate matching text comprises the at least one of the associated text of the emoticon picture or the associated text of the similar emoticon package.

* * * * *